(12) United States Patent
Nam

(10) Patent No.: US 8,160,652 B2
(45) Date of Patent: Apr. 17, 2012

(54) MOBILE TERMINAL AND SCREEN DISPLAYING METHOD THEREOF

(75) Inventor: Seung Woo Nam, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 12/406,852

(22) Filed: Mar. 18, 2009

(65) Prior Publication Data

US 2009/0239588 A1    Sep. 24, 2009

(30) Foreign Application Priority Data

Mar. 21, 2008  (KR) .................. 10-2008-0026462

(51) Int. Cl.
*H04M 1/00*  (2006.01)
*G06F 3/041*  (2006.01)

(52) U.S. Cl. ...................... 455/566; 715/863

(58) Field of Classification Search .................. 455/566; 345/173; 715/863, 753

See application file for complete search history.

(56) References Cited

U.S. PATENT DOCUMENTS

2006/0161871 A1*  7/2006  Hotelling et al. ............. 715/863
2008/0168361 A1*  7/2008  Forstall et al. ................ 715/753

FOREIGN PATENT DOCUMENTS

JP    8212005    8/1996

* cited by examiner

*Primary Examiner* — Daniel D Chang
(74) *Attorney, Agent, or Firm* — Lee, Hong, Degerman, Kang & Waimey

(57) ABSTRACT

A mobile terminal and method for displaying on a touch screen information associated with an item displayed on the touch screen when an object is in near-proximity to the displayed item. A sensing unit senses a real-touch and a proximity-touch of the touch screen and a controller displays the information associated with the specific item on the touch screen.

18 Claims, 12 Drawing Sheets

FIG. 8
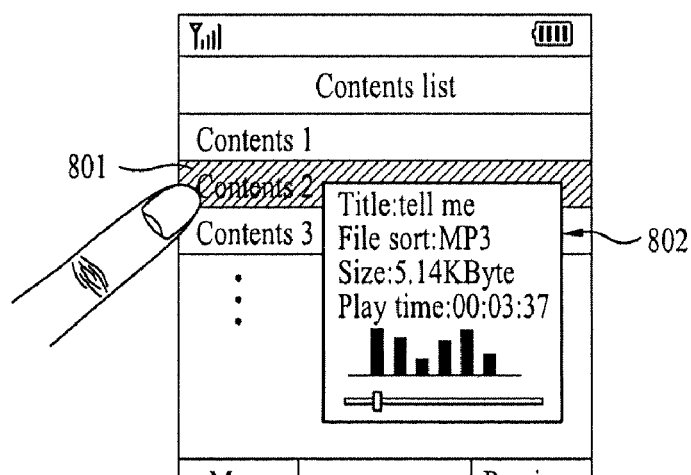
(a)
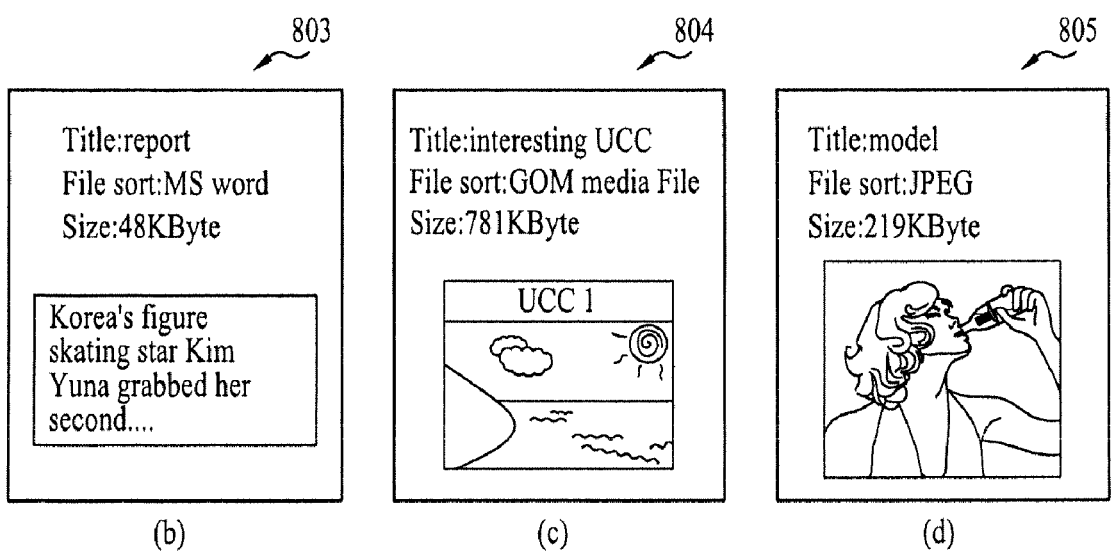
(b)　　　(c)　　　(d)

MOBILE TERMINAL AND SCREEN DISPLAYING METHOD THEREOF

Pursuant to 35 U.S.C. §119(a), this application claims the benefit of Korean Patent Application No. 10-2008-0026462, filed on Mar. 21, 2008, the contents of which are hereby incorporated by reference herein in their entirety.

FIELD OF THE INVENTION

The present invention relates to a mobile terminal touch screen capable of sensing an object in near-proximity to the touch screen.

BACKGROUND OF THE INVENTION

A mobile terminal is a portable communication device which may be configured to perform various functions. Examples of the various functions include data and voice communications, capturing still and video images via a camera, recording audio files, playing back music files via a speaker system, and displaying images and video on a display. Some mobile terminals include additional functionality which supports game playing, while other mobile terminals are configured as multimedia players.

Recently, mobile terminals have been configured to receive broadcast and multicast signals which permit viewing of content such as videos and television programs.

Efforts are ongoing to further support and increase the functionality of mobile terminals. Such efforts include software and hardware improvements, as well as changes and improvements in the structural components which form the mobile terminal. Other efforts include mobile terminals having the capability of inputting key signals using a touch screen.

SUMMARY OF THE INVENTION

In one aspect of the present invention, a mobile terminal includes a display including a touch screen, a sensing unit for sensing an object in near-proximity to the touch screen, and a controller for displaying information associated with an item displayed on the touch screen when the object is in near-proximity to the item.

It is contemplated that the controller executes a function associated with the item when the object contacts the item on the touch screen. It is further contemplated that the controller displays additional information associated with the item when the object contacts the item on the touch screen.

It is contemplated that the controller facilitates the information associated with the item to disappear from the display when the object is no longer in near-proximity to the touch screen. It is further contemplated that the information disappears after a predetermined time from when the object is no longer in near-proximity to the touch screen.

It is contemplated that the item comprises an item displayed in a phone book list. It is further contemplated that the information associated with the item displayed in the phone book list comprises at least one of an image, recent call information, message transceiving information, a current position, and a current state.

It is contemplated that the item comprises a group of contact addresses. It is further contemplated that the information associated with the group of contact addresses comprises a plurality of contact names arranged in an order according to one of most recently called and most frequently called.

It is contemplated that the item is a menu item related to a specific function. It is further contemplated that the information associated with the menu item comprises at least one of a sub-menu of the menu and an explanation of the menu.

It is contemplated that the information associated with the item comprises an option menu associated with the item. It is further contemplated that the information associated with the item comprises a plurality of contents associated with the item, and wherein the controller displays the plurality of contents in an order according to one of most recently used and most frequently used.

It is contemplated that the item is a word displayed on the touch screen and the information comprises dictionary information for the word. It is further contemplated that the item is a virtual input button displayed on the touch screen and the information comprises a plurality of input symbols associated with the virtual input button.

In another aspect of the present invention, a method for displaying information on a mobile terminal touch screen is provided. The method includes sensing an object in near-proximity to the touch screen, and displaying information associated with an item displayed on the touch screen when the object is in near-proximity to the item.

Additional features and advantages of the invention will be set forth in the description which follows, and in part will be apparent to those having ordinary skill in the art upon examination of the following or may be learned from practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIGS. 6 to 14 illustrate screen displays using a proximity-touch or a real touch in the mobile terminal according to one embodiment of the present invention.

DETAILED DESCRIPTION OF THE PREFERRED EMBODIMENTS

Reference will be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers are used throughout the drawings to refer to the same or similar parts.

Figure 1:
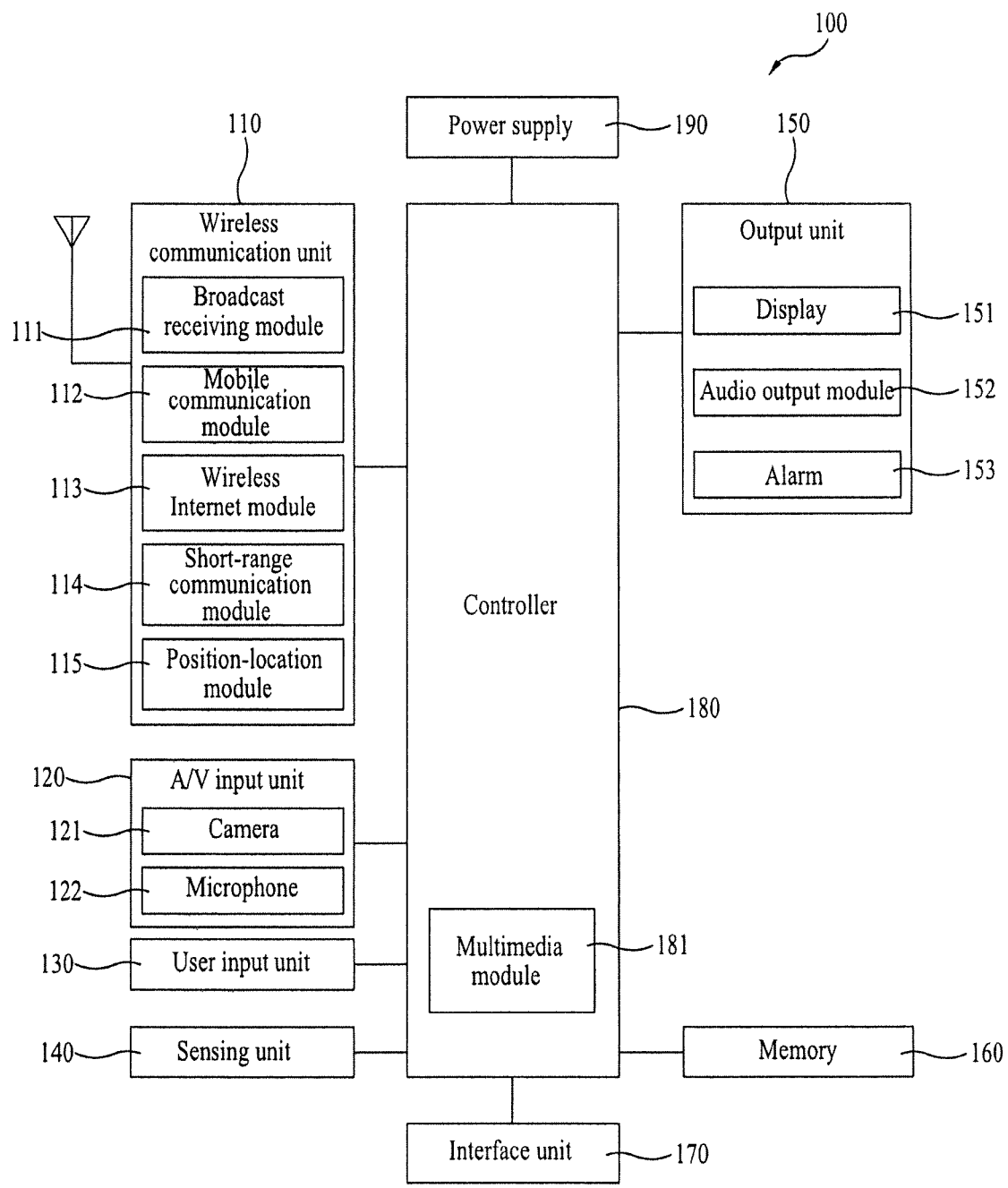
FIG. 1 illustrates a block diagram of a mobile terminal in accordance with an embodiment of the present invention.

FIG. 1 is a block diagram of a mobile terminal 100 in accordance with an embodiment of the present invention. The communication device may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal. However, such teachings apply equally to other types of terminals.

FIG. 1 illustrates the mobile terminal 100 having various components, but it is understood that implementing all of the illustrated components is not a requirement. More or less components may alternatively be implemented.

FIG. 1 illustrates a wireless communication unit 110 configured with commonly implemented components. For example, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system that transmits a broadcast signal and/or broadcast associated information.

Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T).

Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). The signals may represent audio, video, multimedia, control signaling, and data, among others.

The wireless Internet module 113 supports Internet access for the mobile terminal. The wireless Internet module 113 may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal. The position-location module 115 may be implemented using global positioning system (GPS) components that cooperate with associated satellites, network components, and combinations thereof.

The audio/video (A/V) input unit 120 is configured to provide audio or video signal input to the mobile terminal 100. As illustrated, the A/V input unit 120 includes a camera 121 and a microphone 122.

The camera receives and processes image frames of still pictures or video. The microphone 122 receives an external audio signal while the mobile terminal 100 is in a specific mode, such as phone call mode, recording mode and voice recognition mode. This audio signal is processed and converted into digital data.

The mobile terminal 100, and specifically the A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. Two or more microphones and/or cameras may be used.

The user input unit 130 generates input data responsive to user manipulation of an associated input device or devices. The input devices may include a keypad, a dome switch, a jog wheel, a jog switch or a touchpad utilizing static pressure or capacitance. A specific example is one in which the user input unit 130 configured as a touchpad in cooperation with a touch screen display will be described in more detail.

The sensing unit 140 provides status measurements of various aspects of the mobile terminal 100. For example, the sensing unit 140 may detect an open/close status of the mobile terminal 100, a position change of the mobile terminal or a component of the mobile terminal, a presence or absence of user contact with the mobile terminal, orientation of the mobile terminal, acceleration or deceleration of the mobile terminal or relative positioning of components of the communications device, such as a display or keypad.

The sensing unit 140 in a mobile terminal 100 configured as a slide-type mobile terminal may sense whether a sliding portion of the mobile terminal is open or closed. The sensing unit 140 may also sense the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, earphones, microphones, and storage devices configured to store data such as audio, video, or pictures. The interface unit 170 may be configured using a wired/wireless data port, audio input/output ports and video input/output ports, or a card socket for coupling to a memory card, subscriber identity module (SIM) card, user identity module (UIM) card, or removable user identity module (RUIM) card.

The output unit 150 generally includes various components which support the output requirements of the mobile terminal 100. The display 151 is typically implemented to visually display information associated with the mobile terminal 100.

For example, the display will generally provide a user interface or graphical user interface that includes information associated with placing, conducting, and terminating a phone call if the mobile terminal is operating in a phone call mode. As another example, the display 151 may additionally or alternatively display images associated with a video call mode or a photographing mode of the mobile terminal 100.

The display 151 may be configured as a touch screen working in cooperation with an input device, such as a touchpad, in one embodiment. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more of displays 151. An example of a two-display embodiment is one display 151 configured as an internal display viewable when the mobile terminal 100 is in an opened position and a second display configured as an external display viewable in both the open and closed positions.

FIG. 1 further illustrates output unit 150 having an audio output module 152 which supports the audio output requirements of the mobile terminal 100. The audio output module 152 may be implemented using one or more speakers, buzzers, other audio producing devices, and combinations thereof.

The audio output module 152 functions in various modes including a call-receiving mode, a call-placing mode, a recording mode, a voice recognition mode, or a broadcast reception mode. The audio output module 152 outputs audio related to a particular function during operation of the mobile terminal 100, such as call received, message received, or errors.

The output unit 150 is further shown having an alarm module 153, which is commonly used to signal or otherwise identify the occurrence of a particular event associated with the mobile terminal 100. Typical events include call received, message received and user input received.

Examples of outputs of the alarm module 153 include tactile sensations to a user such as vibration. For example, the alarm 153 may be configured to vibrate when the mobile terminal 100 receives a call or message or receives a user input in order to provide a tactile feedback mechanism. It is understood that the various outputs provided by the components of output unit 150 may be separately performed or the outputs may be performed using any combination of the components.

The memory 160 is generally used to store various types of data to support the processing, control, and storage requirements of the mobile terminal. Examples of such data include program instructions for applications operating on the mobile terminal, contact data, phonebook data, messages, pictures, and video.

The memory 160 may be implemented using any type or combination of suitable volatile and non-volatile memory or storage devices. Examples of such devices include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, and other similar memory or data storage devices.

The controller 180 typically controls the overall operations of the mobile terminal 100. For example, the controller 180 performs control and processing associated with voice calls, data communications, video calls, camera operations and recording operations.

The controller 180 may include a multimedia module 181 that provides multimedia playback. The multimedia module 181 may be configured as part of the controller 180, or this module may be implemented as a separate component.

The power supply 190 provides power required by the various components for the mobile terminal. The provided power may be internal power, external power, or combinations thereof.

Various embodiments described herein may be implemented in a computer-readable medium. The computer-readable medium may utilize computer software, hardware, or some combination thereof.

The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Controller 180 may implement the embodiments.

The embodiments described herein may be implemented in a software implementation with separate software modules, such as procedures and functions, each of which perform one or more of the functions and operations described herein. The software codes can be implemented with a software application written in any suitable programming language that is stored in the memory 160 and executed by the controller 180.

Mobile terminal 100 may be implemented in a variety of different configurations. Examples of such configurations include folder-type, slide-type, bar-type, rotational-type, swing-type and combinations thereof.

For clarity, further disclosure will primarily relate to a slide-type mobile terminal. However such teachings apply equally to other types of terminals.

Figure 2:
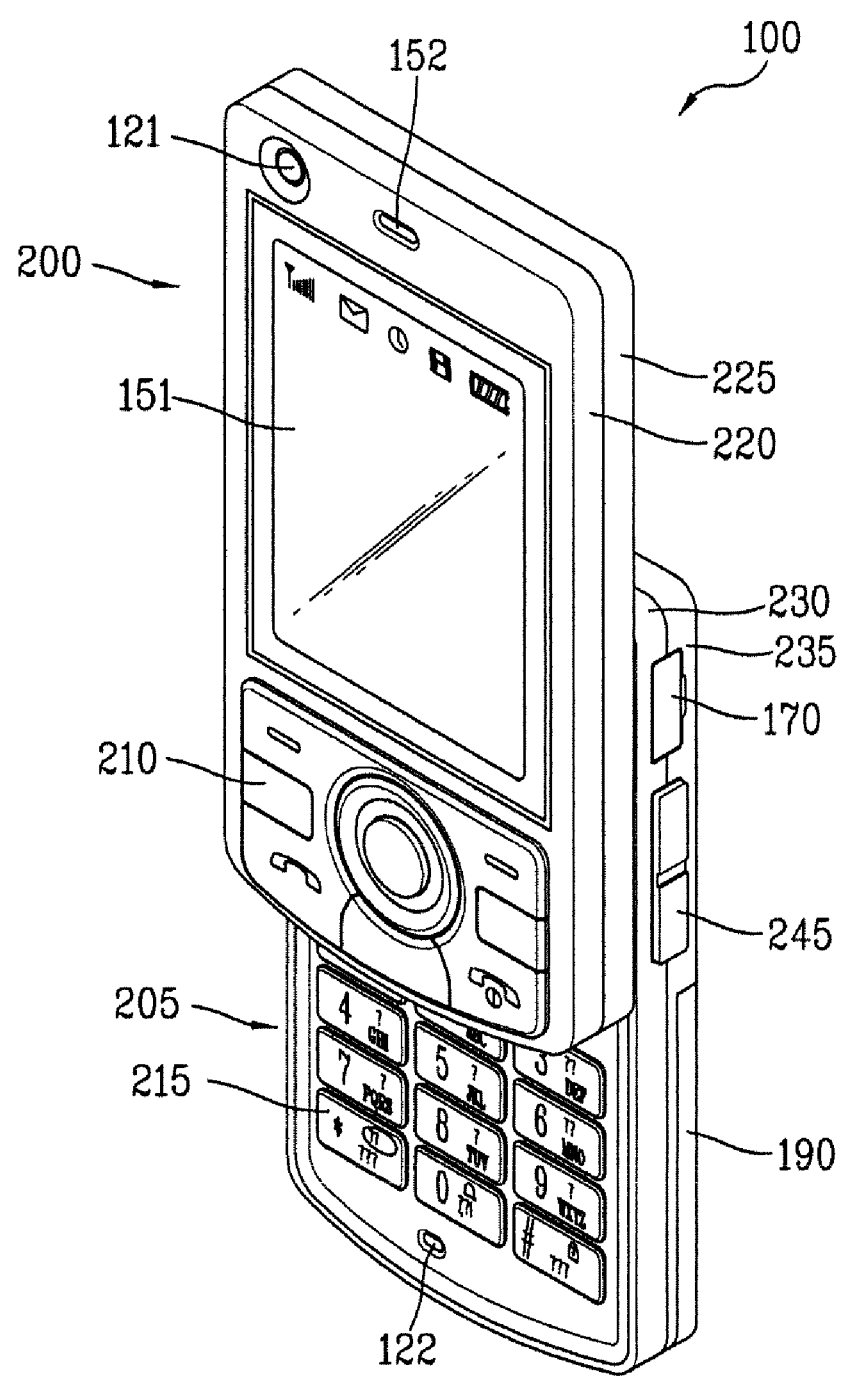
FIG. 2 illustrates a perspective view of a front side of a mobile terminal according to an embodiment of the present invention.

FIG. 2 is a perspective view of a front side of a mobile terminal according to an embodiment of the present invention. As illustrated in FIG. 2, the mobile terminal 100 is shown having a first body 200 configured to slideably move relative to a second body 205.

The user input unit 130 is implemented using function keys 210 and a keypad 215. The function keys 210 are associated with first body 200 and the keypad 215 is located on second body 205. The keypad 215 includes various keys such as numbers, characters, and symbols, to enable a user to place a call, prepare a text or multimedia message, and otherwise operate the mobile terminal 100.

The first body 200 slides relative to second body 205 between open and closed positions of the mobile terminal 100. The first body is positioned over the second body 205 in a closed position such that the keypad 215 is substantially or completely covered by the first body 200. User access to the keypad 215 and the display 151 and function keys 210 is facilitated in the open position. The function keys 210 provide a convenient for a user to enter commands, such as 'start', 'stop' and 'scroll'.

The mobile terminal 100 may operate in either a standby mode to receive a call or message or receive and respond to network control signaling, or in an active call mode. The mobile terminal 100 typically operates in a standby mode when in the closed position and operates in the active mode when in the open position. However, the mode configuration may be changed as required or desired.

The first body 200 is illustrated as formed from a first case 220 and a second case 225. The second body 205 is shown formed from a first case 230 and a second case 235. The first case 220, 230 and second cases 225, 235 are usually formed from a suitably ridge material, such as injection molded plastic, or formed using metallic material, such as stainless steel (STS) and titanium (Ti).

One or more intermediate cases may be provided between the first cases 220, 230 and second cases 225, 235 of one or both of the first 200 and second 205 bodies. The first and second bodies 200, 205 are typically sized to receive electronic components necessary to support operation of the mobile terminal 100.

The first body 200 is illustrated having a camera 121 and audio output unit 152 configured as a speaker positioned relative to the display 151. The camera 121 may be constructed such that it can be selectively positioned relative to first body 200 by being rotated or swiveled.

The function keys 210 are positioned adjacent to a lower side of the display 151. The display 151 is shown implemented as an LCD or OLED. Recall that the display may also be configured as a touch screen having an underlying touchpad which generates signals responsive to user contact with the touch screen, such as with a finger or stylus.

The second body 205 has a microphone 122 positioned adjacent to keypad 215, and side keys 245, which function as a user input unit. Preferably, the side keys 245 are configured as hot keys, such that the side keys are associated with a particular function of the mobile terminal 100.

An interface unit 170 is shown positioned adjacent to the side keys 245, and a power supply 190 in a form of a battery is located on a lower portion of the second body 205.

Figure 3:
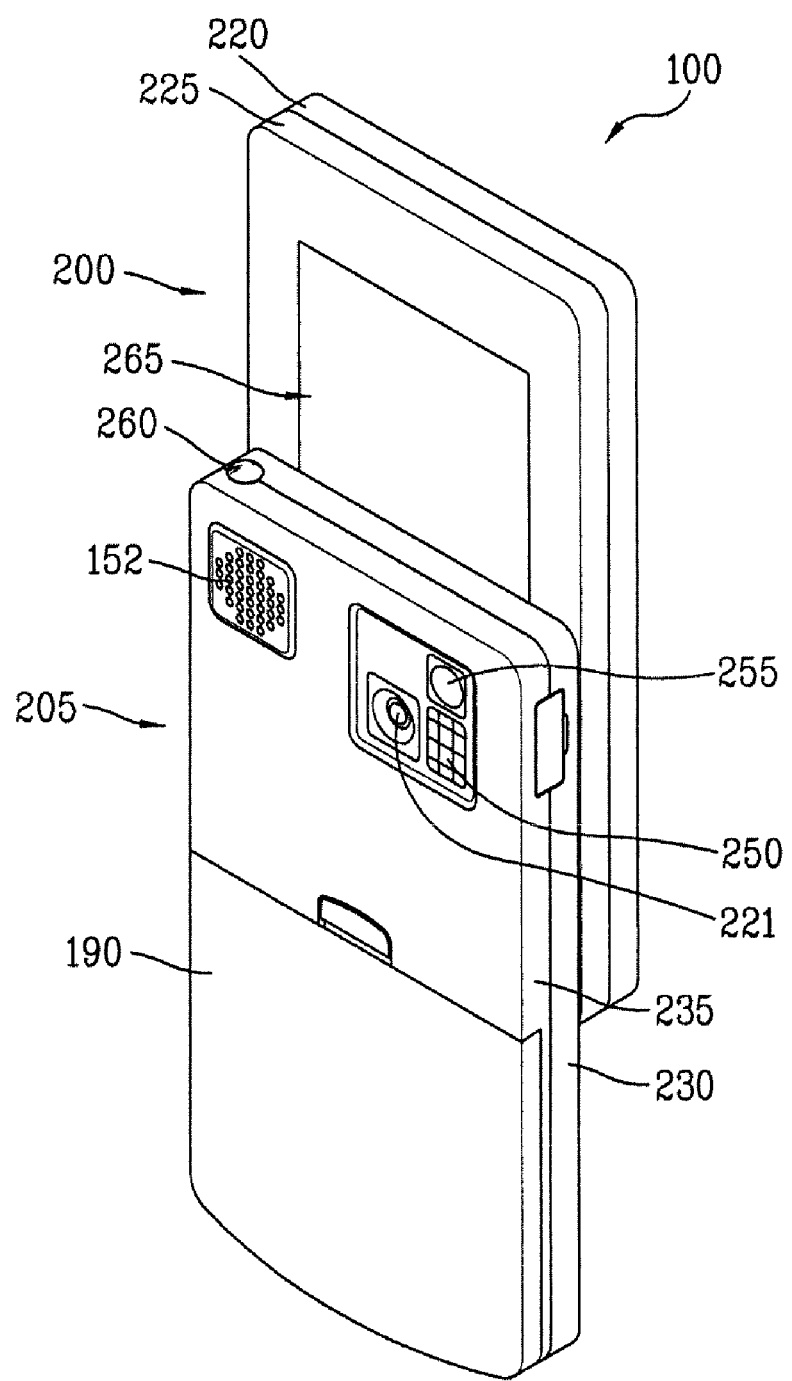
FIG. 3 illustrates a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255.

The flash operates in conjunction with the camera 221 of the second body. The mirror 255 is useful for assisting a user to position camera 121 in a self-portrait mode.

The camera 221 of the second body faces a direction which is opposite to a direction faced by camera 121 of the first body 200 (FIG. 2). Each of the cameras 121, 221 of the first and second bodies may have the same or different capabilities.

The camera 121 of the first body 200 operates with a relatively lower resolution than the camera 221 of the second body 205. This configuration works well during a video conference, for example, in which reverse link bandwidth capabilities may be limited. The relatively higher resolution of the camera 221 of the second body 205 facilitates higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111. The antenna 260 may be fixed or configured to retract into the second body 205.

The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
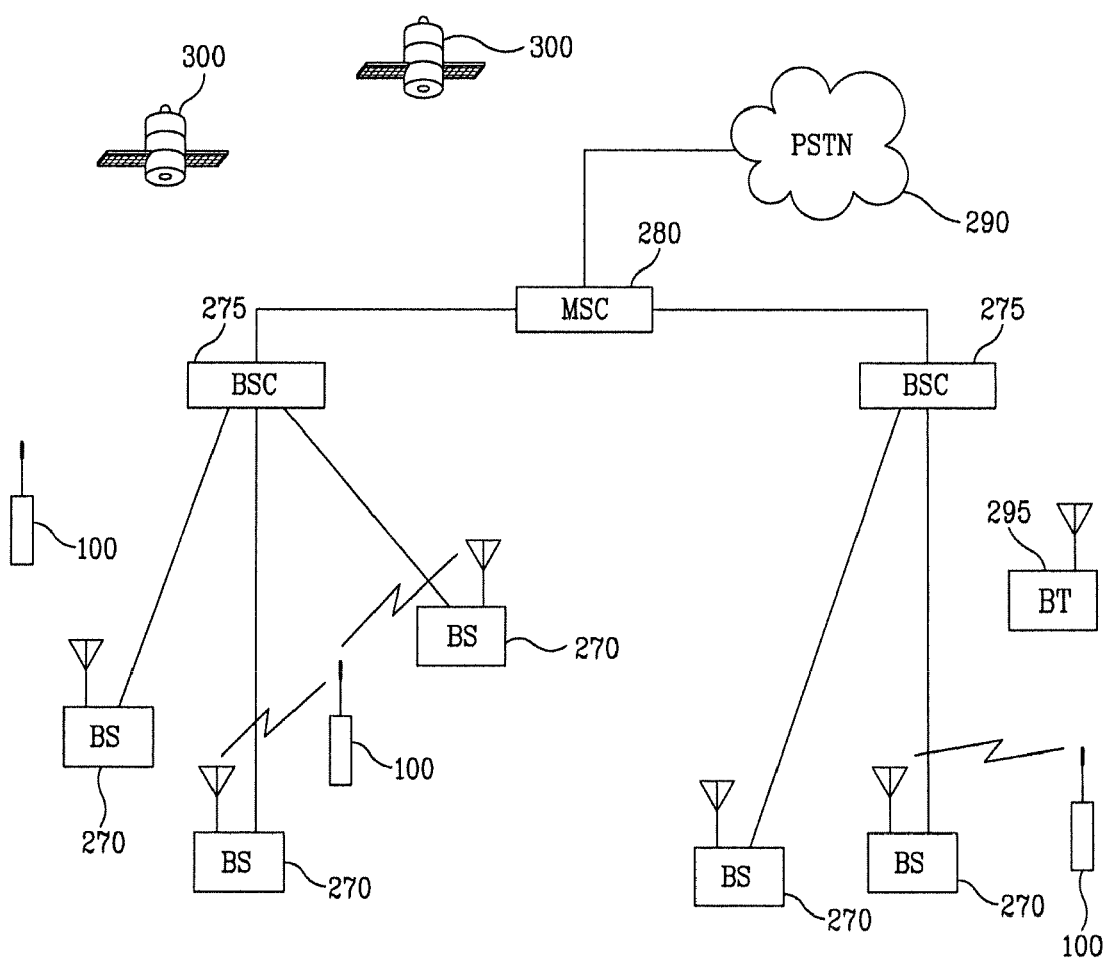
FIG. 4 illustrates a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs).

In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. The satellites 300 facilitate locating the position of some or all of the mobile terminals 100.

Although two satellites are illustrated, it is understood that useful positioning information may be obtained with greater or fewer satellites. The position-location module 115 typically configured to cooperate with the satellites 300 in order to obtain desired position information. It is contemplated that other types of position detection technology, such as location technology that may be used in addition to or instead of GPS location technology, may alternatively be implemented. Some or all of the GPS satellites 300 may alternatively or additionally be configured to provide satellite DMB transmissions.

The base stations 270 receive sets of reverse-link signals from various mobile terminals 100. The mobile terminals 100 are engaging in calls, messaging, and other communications.

Each reverse-link signal received by a given base station 270 is processed within that base station. The resulting data is forwarded to an associated BSC 275.

The BSCs 275 provide call resource allocation and mobility management functionality including the orchestration of soft handoffs between base stations 270. The BSCs 275 also route the received data to the MSC 280, which provides additional routing services for interfacing with the PSTN 290. The PSTN interfaces with the MSC 280, and the MSC interfaces with the BSCs 275, which in turn control the base stations 270 to transmit sets of forward-link signals to the mobile terminals 100.

A method of displaying a screen using a relation of proximity-touch (also referred to as "near-proximity" touch) and real-touch in a mobile terminal according to an embodiment of the present invention will be described. The proximity-touch refers to when a pointer does not actually touch the touch screen but approaches the touch screen and is spaced by a predetermined distance therefrom. The pointer refers to a tool for real touching or proximately touching a specific area on the displayed screen, such as a stylus pen or a finger. The controller 180 can recognize the proximity-touch as a predetermined signal input. When the pointer approaches within a predetermined distance from the touch screen, the mobile terminal 100 recognizes it as the proximity-touch or near-proximity touch. The predetermined distance refers to a vertical distance between the pointer and the touch screen.

The real-touch refers to when the pointer is real-touched on the touch screen. The controller 180 recognizes the real-touch as a predetermined signal input. This can be implemented in the mobile terminal including a touch screen.

In one embodiment of the present invention the mobile terminal 100 can sense the proximity-touch or the real-touch through a sensing unit 140. The sensing unit 140 may include various sensors for performing various sensing functions. For example, the sensing unit 140 may include a proximity sensor or a tactile sensor to sense the proximity-touch or the real-touch. The proximity sensor refers to a proximity switch that detects the presence or absence of objects approaching a detection surface or objects existing near the detection surface using electromagnetic force or infrared rays without a mechanical contact.

The proximity switch refers to a switch that does not facilitate an ON/OFF output through the mechanical contact but outputs the ON/OFF output if a sensing object is entered within the sense distances defined by the sensor. The proximity switch has a longer lifespan and higher utilization as compared to the touch switch.

The operating principle of the proximity-switch attenuates or stops oscillation amplitude of an oscillation circuit if the sensing object approaches the sensing surface of the sensor during oscillation of sinusoidal high frequency in the oscillation circuit and converts the change into an electrical signal, thereby detecting the presence or absence of the sensing object.

Therefore, even though any materials, including non metal materials, are placed between the high frequency oscillating proximity switch and the sensing object, the proximity switch detects the sensing object.

The tactile sensor refers to a sensor that senses a touch contact with a specific object beyond a degree of human perception. The tactile sensor can sense a variety of information, such as the roughness of the touch surface, the hardness of the touch object, and the temperature of the touch point.

Alternatively, the sensing unit 140 can also sense a proximity-distance or a proximity speed. The proximity-distance refers to a spaced distance between the touch screen and the pointer. Specifically, the proximity-distance may refer to the shortest distance between the touch screen and the pointer. The proximity speed refers to a speed at which the pointer approaches the touch screen. The proximity speed may also refer to the speed at which the pointer moves away from the touch screen.

The sensing unit 140 may sense a touch-drag or a proximity-drag. The sensing unit 140 may also sense a drag direction, a drag speed, or a drag-length of the touch-drag or the proximity-drag. The touch-drag is when the touched point moves in a maintenance state of the real-touch and is dragged in its maintenance state.

The proximity-drag is when the proximity-touched point moves in a maintenance state of the proximity-touch where the proximity-touch is dragged in its maintenance state. Proximately touching the predetermined point on the touch screen recognizes the pointer positioned at a position on a space vertically corresponding to the predetermined point as the proximity-touch.

In another embodiment of the present invention, the mobile terminal 100 can recognize the proximity-touch or the real-touch as the predetermined input signal. The pointer is a tool for real touching or proximately touching a specific part on the displayed screen, such as a stylus pen or a finger.

Figure 5:
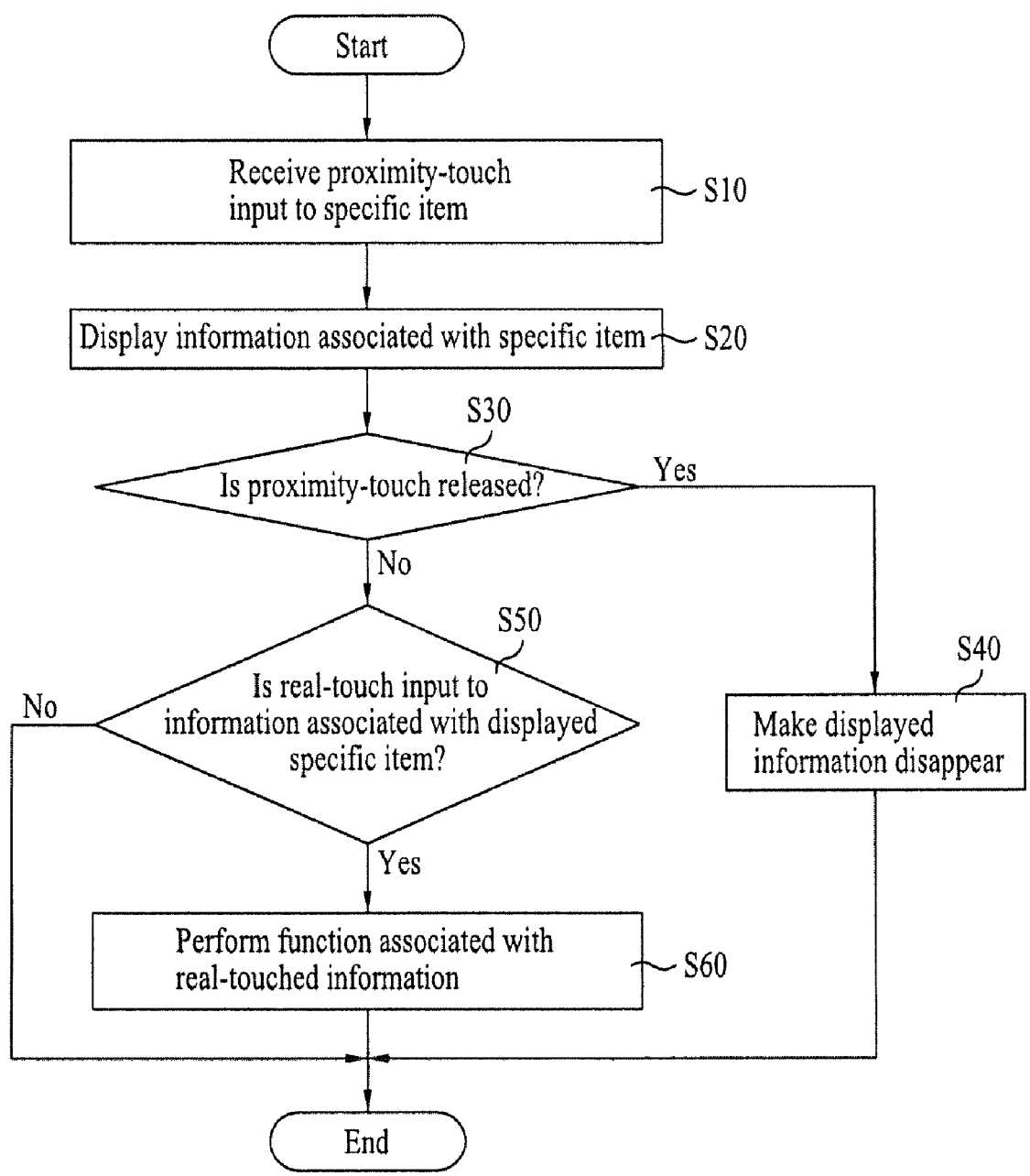
FIG. 5 illustrates a flow chart showing a screen displaying method of the mobile terminal according to one embodiment of the present invention.

FIG. 5 illustrates a flow chart of a screen displaying method of the mobile terminal according to one embodiment of the present invention.

The controller 180 controls the display of various screens on the mobile terminal display 151 including a touch screen. Specific items that may be displayed on the screen include items associated with a phone book, a menu related item for performing specific functions, an icon displaying specific information, a contents related item, specific words displayed on a text document, and a region for inputting specific signals on a keypad for inputting key signals.

When the displayed items are proximity-touched, the sensing unit 140 recognizes the proximity-touch (S10). For example, the proximity-touch can be sensed using the proximity sensor.

When the proximity-touch of the specific item is sensed through the sensing unit 140, the controller 180 displays (S20) the information associated with the specific items. The information associated with the specific items may be sub-items associated with the specific items and may be the detailed information associated with the specific items.

When the proximity-touch is recognized through the pointer and the pointer used is positioned out of a predetermined distance from the displayed screen for a predetermined time, the proximity-touch may be released. The controller 180 controls (S30, S40) the information associated with the displayed specific items to be removed from display.

The controller 180 can perform (S50, S60) functions associated with a touched specific region when the specific region displaying the information associated with the specific items is real-touched after the proximity-touch. For example, functions performed as the information associated with the specific items by the proximity-touch may include facilitating an image corresponding to a specific party stored on the phone book list, recent call information, message transceiving information, a current position, or a current state may be displayed. The controller 180 can display the recent call information with the corresponding party when the "recent call information" is real-touched.

As illustrated in FIGS. 6 to 14, the screen displaying method using the proximity-touch in the mobile terminal 100 according to embodiments of the present invention will be described.

Figure 6:
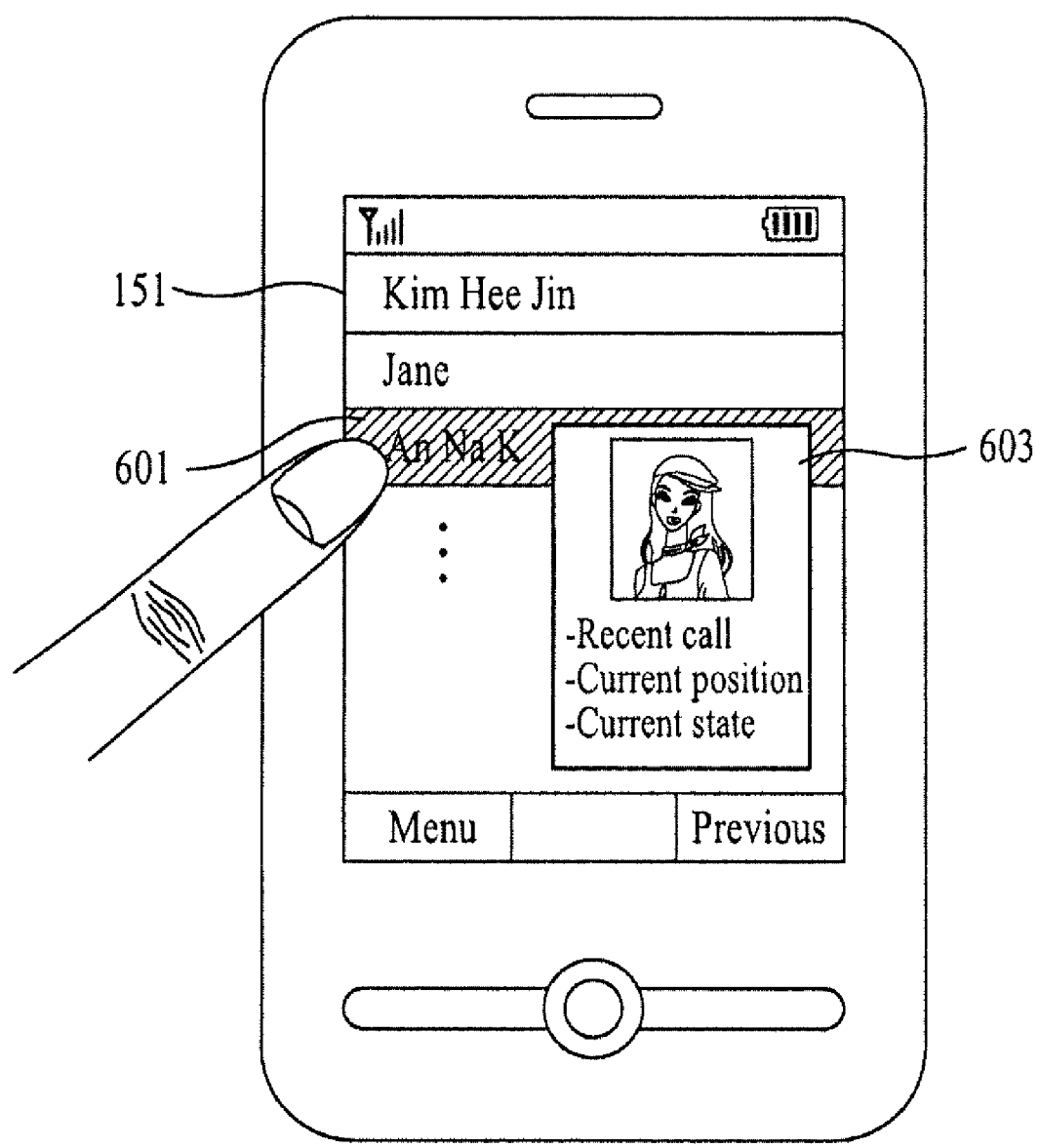

FIG. 6 illustrates a screen displaying detailed information on the phone book list of the mobile terminal according to one embodiment of the present invention.

A party list stored in the phone book is displayed on the display 151 in a list type. When the specific party related item 601 is proximity-touched in the displayed party list, the sensing unit 140 senses the proximity-touch. The controller 180 displays a pop-up window 603 including the detailed information associated with the party related item 601 when the proximity-touch is sensed.

The image for the corresponding party, the recent call information, the current position of the corresponding party and the current state of the corresponding party may be displayed on the pop-up window 603. In addition to the information shown on the pop-up window 603, a variety of information may be included as the detailed information associated with the related item 601. For example, schedule information associated with the corresponding party, a representative telephone, or a transceiving message may be included.

As used herein, 'current information' is state information related to the corresponding party currently displayed on an instant messenger when the corresponding party joins the instant messenger service. For example, the current information may include whether the corresponding party is currently logged-in in the instant messenger, or how the current state is displayed if the corresponding part is logged-in.

The controller 180 can display the information in the pop-up window 603 in various means since the representative telephone number can be changed according to the current position. For example, when the corresponding party is at home, the controller 180 may display the home telephone number as the representative telephone number, and when the corresponding party is away from home the controller 180 may display the telephone number corresponding to the mobile terminal of the corresponding party as the representative telephone number. The controller 180 may also display the recent transceiving message as characters flowing along one line.

The controller 180 can perform animation of an avatar when the image displaying the corresponding party of the information included in the pop-up window 603 is in an avatar type. For example, the controller 180 may display the avatar in a shape waving hands when the communication with the corresponding party can be made. The controller 180 can display the avatar in a working shape when the corresponding party is busy.

When the proximity-touch is recognized through the pointer and when the pointer used is positioned out of a predetermined distance from the displayed screen for a predetermined time, the proximity-touch may be released. In this case, the controller 180 can control the displayed pop-up window 603 to be removed from the screen.

The controller 180 can perform the specific function associated with the real-touched region when the specific region in the pop-up window 603 is real-touched. For example, the controller 180 can display the recent call history in a list type when a region where the "recent call" related item is positioned and is real-touched.

Figure 7:
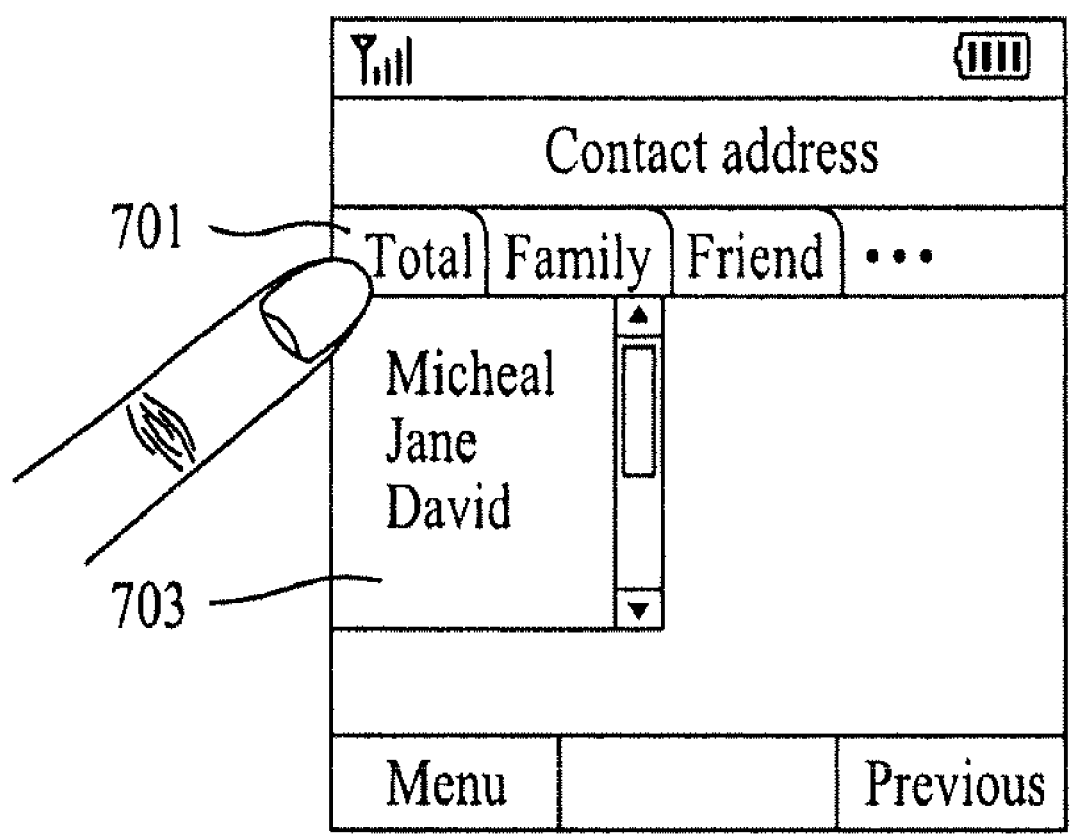

FIG. 7 illustrates a screen displaying specific information using the proximity-touch on the phone book list of the mobile terminal according to one embodiment of the present invention.

The contact address information stored in the phone book is displayed on the display screen in a grouped format. The controller 180 can display a list 703 including contact addresses corresponding to a proximity-touched specific group when an item 701 corresponding to the specific group is proximity-touched.

The controller 180 displays the list of the contact addresses in order of a recent call or a maximum frequency call. The reference for the display order of the list of the contact addresses can be changed by the user setting. The controller 180 may also call the real-touched contact address when the specific contact address of the displayed contact addresses in the list 703 is real-touched.

When the proximity-touch is recognized through the pointer and when the pointer used is positioned out of a predetermined distance from the displayed screen for a predetermined time, the proximity-touch may be released. The controller 180 may control the displayed list 703 to be removed from display.

FIG. 8 illustrates a screen displaying proximity-touched related content information when specific contents are proximity-touched in a contents list of the mobile terminal according to one embodiment of the present invention.

When specific contents 801 are proximity-touched on the screen displaying the contents list, the controller 180 can display the detailed information associated with the proximity-touched contents. FIG. 8(*a*) illustrates a screen display when the proximity-touched content 801 is an audio file, FIG. 8(*b*) a screen display when the proximity-touched content 801 is a text document file, FIG. 8(*c*) a screen display when the proximity-touched content 801 is a moving picture file, and FIG. 8(*d*) a screen display when the proximity-touched content 801 is an image file.

The detailed information 802, 803, 804, 805 associated with the proximity-touched contents may include a title, a file sort, or a file size of the corresponding contents. For example, the controller 180 may reproduce the corresponding contents by the real-touch when the proximity-touched contents are the audio file or the moving picture file. Additionally, the controller 180 may reproduce the corresponding contents including an audio file or a moving pictured file when a related icon is real-touched.

When the proximity-touch is released, the controller 180 controls the displayed detailed information 802, 803, 804, 805 to be removed from display.

In another embodiment of the present invention, the mobile terminal 100 may display an option menu list associated with specific items using the proximity-touch.

Figure 9:
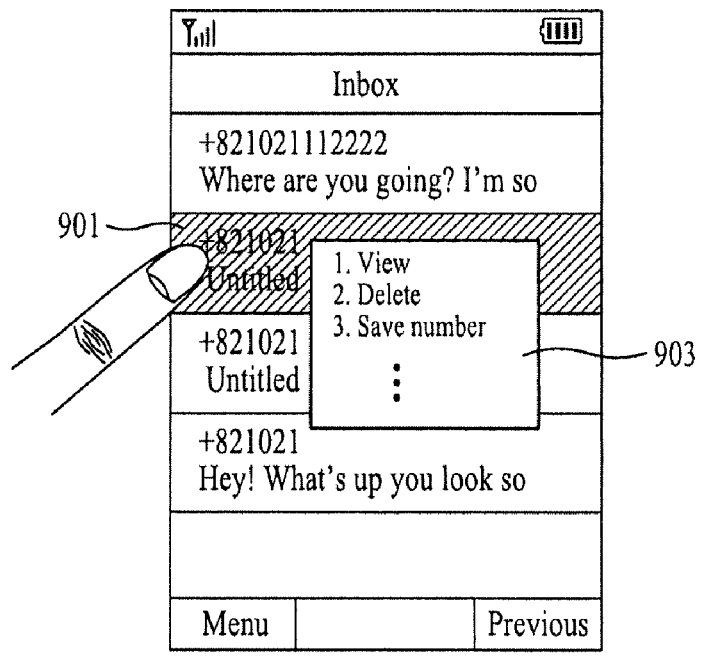

As illustrated in FIG. 9, a call list is displayed in a list type. The controller 180 displays an option menu 903 associated with the corresponding item 901 when the specific item 901 of the call list is proximity-touched. The option menu 903 may include a menu represented by 'View' for viewing in detail the specific item 901, a menu represented by 'Delete' for deleting the specific item 901, and a menu represented by 'View' for storing the telephone number corresponding to the specific item in the phone book. When any one of the menus included in the menu list 903 is real-touched, the controller 180 performs the real-touched menu.

When the proximity-touch is released, the controller 180 controls the displayed option menu list 903 to be removed from display.

Figure 10:
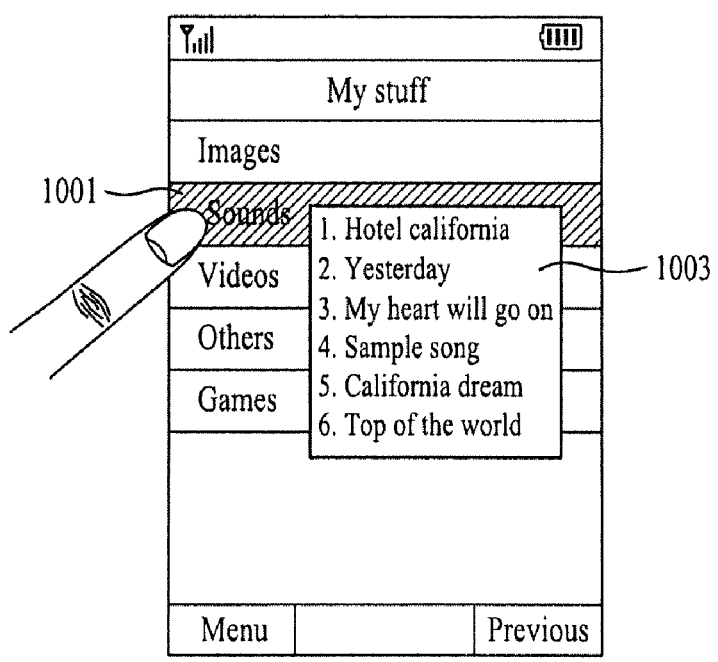
Figure 11:
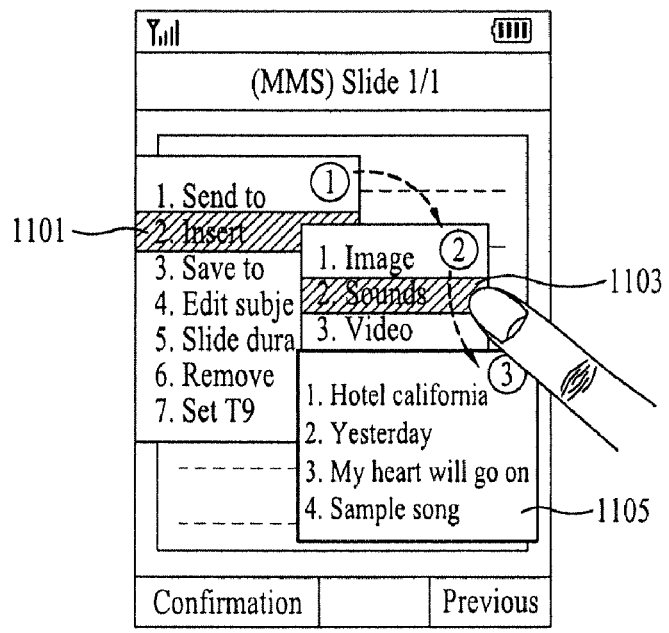

In another embodiment of the present invention, the mobile terminal 100 may display the contents list according to a specific reference using the proximity-touch, as illustrated in FIGS. 10 and 11.

FIG. 10 illustrates the screen display of content related items by a file sort. The controller 180 may display a contents list 1003 corresponding to a proximity-touched item 1001 by a specific order when the specific item 1001 is proximity-touched. For example, the controller 180 can display the contents list in a recently downloaded or generated order. The controller 180 may display the contents list for a predetermined period in order of a maximum frequency of use. When the specific contents in the list 1003 are real-touched, the controller 180 reproduces the real-touched contents.

FIG. 11 illustrates transmitting multimedia contents using a multimedia message service (MMS) in the mobile terminal according to an embodiment of the present invention. When a menu 1101 for attaching the multimedia contents is real-touched, the controller 180 enters the menu for attaching the multimedia contents. The controller 180 displays the contents related item by the file sort.

The controller 180 may display a contents list 1105 corresponding to the proximity-touched item 1103 in a specific order. For example, the controller 180 can display the contents list 1105 in the recently downloaded or generated order. The controller 180 may also display the contents list 1105 for a predetermined period in order of a maximum frequency of use. When the specific contents in the list 1105 are real-touched, the controller 180 attaches the real-touched contents as the file for the MMS message transmission.

Figure 12:
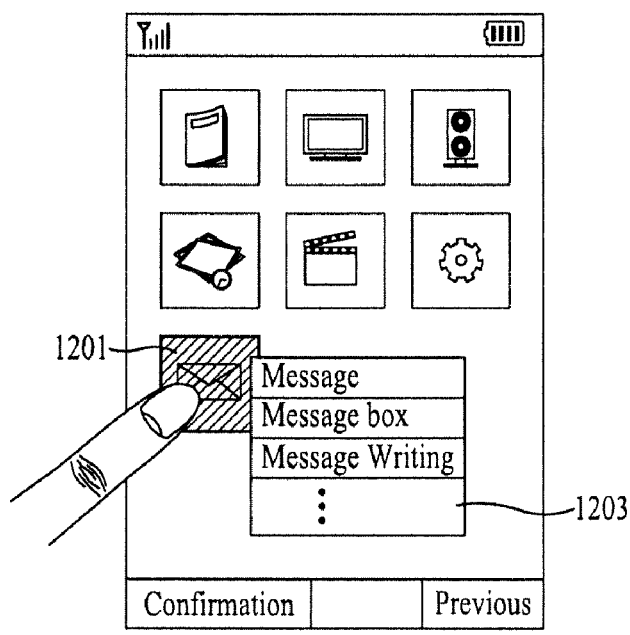

FIG. 12 illustrates a screen displaying a menu item using the proximity-touch in the mobile terminal according to one embodiment of the present invention.

The controller 180 may display a menu item for performing the specific functions of the mobile terminal 100 through icons. When a specific icon 1201 is proximity-touched, the controller 180 displays a list 1203 including a sub-menu item corresponding to the icon 1201. For example, when the 'message' related icon 1201 is proximity-touched, the controller 180 displays the list 1203 including the sub-item associated the message. The controller 180 performs the function corresponding to the real-touched item when the specific item of the displayed list 1203 is real-touched.

In another embodiment of the present invention, the mobile terminal may perform a dictionary function using the proximity-touch on a screen where a text is displayed.

Figure 13:
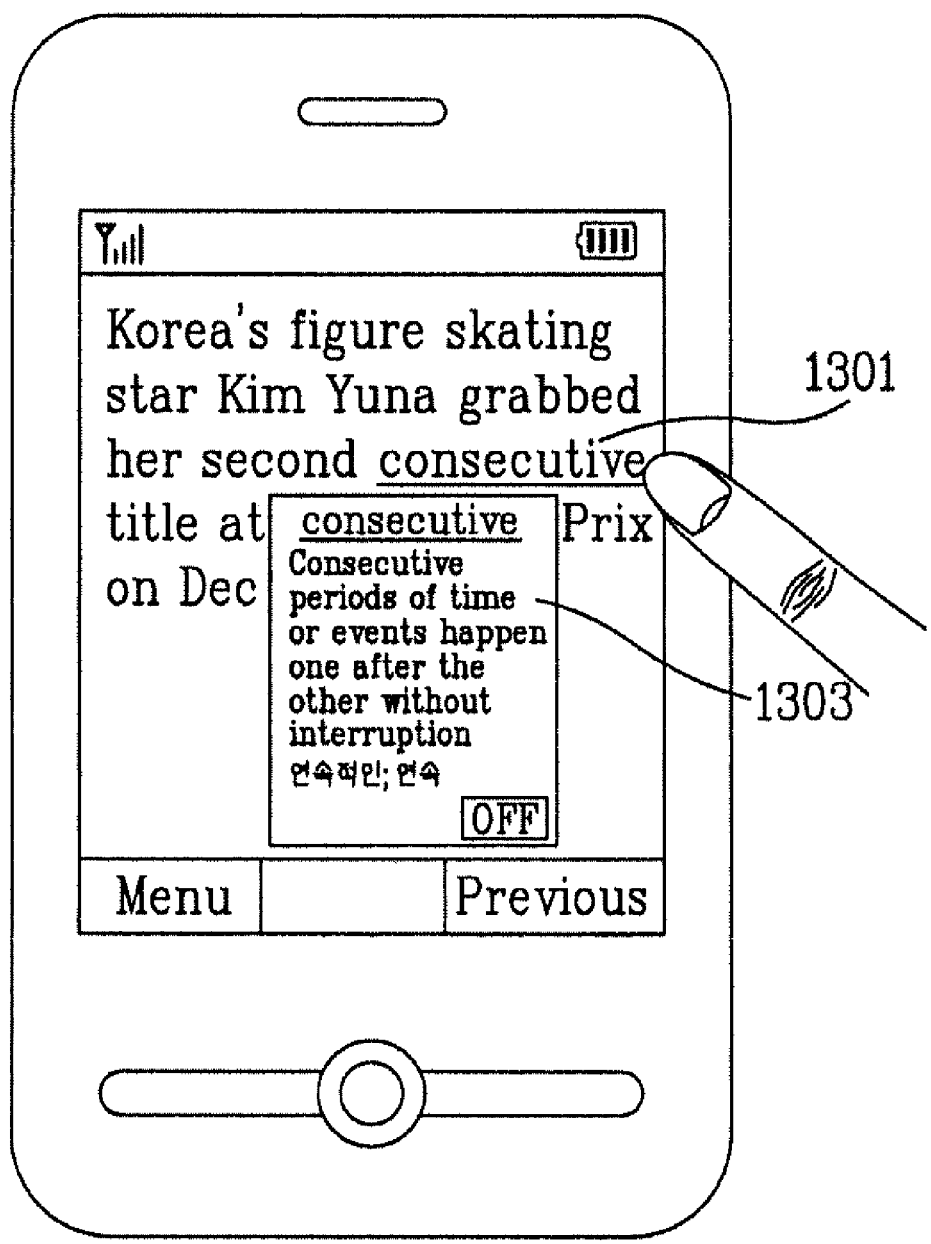

As illustrated in FIG. 13, when a specific word 1301 is proximity-touched, the controller 180 performs a dictionary function for the corresponding word 1301 and displays information 1303 corresponding to the results. For example, the controller 180 may display a lexical meaning, a synonym, or an antonym of the proximity-touched word. When the proximity-touched word is released, the controller 180 controls the dictionary information 1303 for the displayed word to be removed from display.

In yet another embodiment of the present invention, the mobile terminal 100 may conveniently input a specific signal using the proximity-touch.

Figure 14:
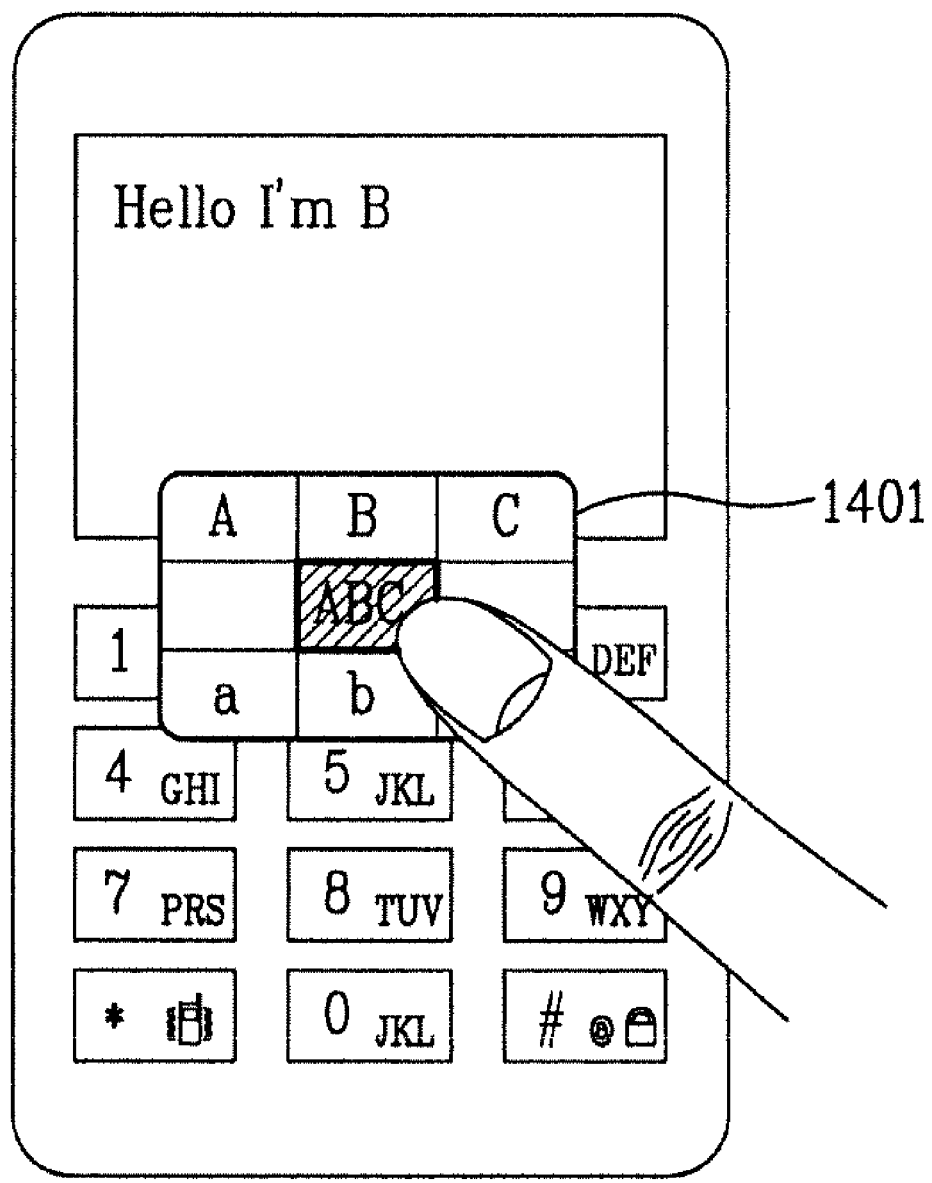

As illustrated in FIG. 14, a key pad for a specific signal input is displayed on the display screen. Regions for a character input are divided on the key pad. The controller 180 may extend and display a proximity-touched region when a specific region of the key pad divided regions is proximity-touched. The characters to be input may be displayed on the extended divided region 1401 of the display screen.

The user can input the characters by real touching the characters displayed on the extended region 1401. The extended region 1401 has an arrangement in a 3*3 matrix type, wherein the region divided within the matrix 1401 is assigned with the characters to be input for displaying.

For example, the specific region for the character input prior to the submission of the proximity-touch is displayed on a center region and the individual characters assigned to a specific region are displayed around the center region. The center region may be a virtual input button that comprises a plurality of input symbols associated with the virtual input button.

When a real touch of the specific region for the character inputting prior to the submission of the proximity-touch, the character region may be touched several times to input the desired character. However, using the proximity-touch, the characters can be input by the real-touch once.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal comprising:
   a touch sensitive display including a touch screen for displaying an item related to a specific function;
   a sensing unit for at least sensing a contact touch or sensing an object in near-proximity to the displayed item; and
   a controller for:
   controlling the touch sensitive display to display first information associated with the displayed item in a pop-up window at a predetermined area of the touch sensitive display when the controller receives a first sensing signal from the sensing unit indicating that the object is in near-proximity to the displayed item, wherein the first information comprises at least one sub-menu of the displayed item;
   receiving a second sensing signal from the sensing unit indicating that a sub-menu of the at least one sub-menu is contact touched;
   controlling the touch sensitive display to display second information associated with the contact touched sub-menu;
   controlling the touch sensitive display to stop displaying the pop-up window when the sensing unit senses that the object is not positioned within a predetermined distance of the touch sensitive display; and executing the specific function related to the displayed item when the controller receives a third sensing signal from the sensing unit indicating that the predetermined area of the touch sensitive display is contact touched.

2. The mobile terminal of claim 1, wherein the controller is further for controlling the touch sensitive display to stop displaying the pop-up window a predetermined time after the sensing unit senses that the object is not positioned within the predetermined distance of the touch sensitive display.

3. The mobile terminal of claim 1, wherein the item is a phone book list.

4. The mobile terminal of claim 3, wherein the at least one sub-menu comprises at least:
an image;
recent call information;
message transceiving information;
a current position; or
a current state.

5. The mobile terminal of claim 1, wherein the item comprises a group of contact addresses.

6. The mobile terminal of claim 5, wherein the at least one sub-menu comprises a plurality of contact names arranged in an order according to most recently called or most frequently called.

7. The mobile terminal of claim 1, wherein:
the at least one sub-menu comprises a plurality of contents associated with the displayed item; and
the controller is further for displaying the plurality of contents in an order according to most recently used or most frequently used.

8. The mobile terminal of claim 1, wherein the item is a word and the at least one sub-menu comprises dictionary information for the word.

9. The mobile terminal of claim 1, wherein the item is a virtual input button and the at least one sub-menu comprises a plurality of input symbols associated with the virtual input button.

10. A method for displaying information on a touch sensitive display of a mobile terminal, the method comprising:
displaying an item on the touch sensitive display, wherein the item is related to a specific function;
receiving a first sensing signal indicating that an object is in near-proximity to the displayed item;
controlling the touch sensitive display to display first information associated with the displayed item in a pop-up window at a predetermined area of the touch sensitive display, wherein the first information comprises at least one sub-menu of the displayed item;
receiving a second sensing signal indicating that a sub-menu of the at least one sub-menu is contact touched;
controlling the touch sensitive display to display second information associated with the contact touched sub-menu;
controlling the touch sensitive display to stop displaying the pop-up window upon sensing that the object is not positioned within a predetermined distance of the touch sensitive display; and
executing the specific function related to the displayed item upon receiving a third sensing signal indicating that the predetermined area of the touch sensitive display is contact touched.

11. The method of claim 10, wherein controlling the touch sensitive display to stop displaying the pop-up window comprises controlling the touch sensitive display to stop displaying the pop-up window a predetermined time after sensing that the object is not positioned within the predetermined distance of the touch sensitive display.

12. The method of claim 11, wherein the item is a phone book list.

13. The method of claim 12, wherein the at least one sub-menu comprises at least:
an image;
recent call information;
message transceiving information;
a current position; or
a current state.

14. The method of claim 10, wherein the item comprises a group of contact addresses.

15. The method of claim 14, wherein the at least one sub-menu comprises a plurality of contact names arranged in an order according to most recently called or most frequently called.

16. The method of claim 10, wherein:
the at least one sub-menu of the item comprises a plurality of contents associated with the displayed item; and
the plurality of contents are displayed in an order according to most recently used or most frequently used.

17. The method of claim 10, wherein the item is a word and the at least one sub-menu comprises dictionary information for the word.

18. The method of claim 10, wherein the item is a virtual input button and the at least one sub-menu comprises a plurality of input symbols associated with the virtual input button.

* * * * *